United States Patent [19]

Courval et al.

[11] Patent Number: 5,204,045
[45] Date of Patent: Apr. 20, 1993

[54] PROCESS FOR EXTRUDING POLYMER SHAPES WITH SMOOTH, UNBROKEN SURFACE

[75] Inventors: Gregory J. Courval, Napanee; Dermot R. M. Thomas; Steven G. Allen, both of Kingston, all of Canada

[73] Assignee: Symplastics Limited, Ontario, Canada

[21] Appl. No.: 715,459

[22] Filed: Jun. 14, 1991

Related U.S. Application Data

[63] Continuation-in-part of Ser. No. 539,076, Jun. 15, 1990, abandoned, and a continuation-in-part of Ser. No. 538,889, Jun. 15, 1990, abandoned.

[51] Int. Cl.$^5$ .............................................. B29C 47/82
[52] U.S. Cl. .............................. 264/323; 264/331.17; 264/DIG. 65
[58] Field of Search ............... 264/40.6, 130, 320, 264/322, 323, 337, 338, DIG. 65, 331.17; 432/13

[56] References Cited

U.S. PATENT DOCUMENTS

| | | | |
|---|---|---|---|
| 3,443,007 | 5/1969 | Hardy | 264/321 |
| 4,225,547 | 9/1980 | Okita | 264/323 X |
| 4,266,919 | 5/1981 | Dunnington et al. | 425/102 |
| 4,303,609 | 12/1981 | Hureau et al. | 264/504 |
| 4,552,712 | 11/1981 | Ramamurthy | 264/85 |
| 4,554,120 | 11/1985 | Ramamurthy | 264/85 |
| 4,587,163 | 5/1986 | Zachariades | 428/292 |
| 4,680,156 | 7/1987 | Collier | 264/171 |
| 4,731,199 | 3/1988 | Matsuo et al. | 252/511 |
| 4,820,466 | 4/1989 | Zachariades | 264/119 |
| 4,830,595 | 5/1989 | Bentivoglio et al. | 425/143 |
| 4,938,913 | 7/1990 | Ward et al. | 264/323 X |

FOREIGN PATENT DOCUMENTS

| | | |
|---|---|---|
| 52-148562 | 12/1977 | Japan. |
| 63-161075 | 7/1988 | Japan. |
| 1480479 | 7/1977 | United Kingdom. |

OTHER PUBLICATIONS

Chung et al., American Chemical Society, Pre-prints vol. 39, for National Meeting of American Chemical Society, 176th, pp. 74–80, Miami Beach (Sep. 1978).
Bigg, Polymer Engineering and Science, vol. 28, pp. 830–841 (1988).

*Primary Examiner*—Leo B. Tentoni
*Attorney, Agent, or Firm*—Fitzpatrick, Cella, Harper & Scinto

[57] ABSTRACT

A solid state extrusion process extrudes a semi-crystalling polymer billet through a die at the end of a pressure chamber. The temperature of the die is controlled so that a thin surface layer of the polymer profile being extruded is melted to form a thin, smooth surface layer on the profile of reduced orientation and increased toughness and which is substantially free of surface imperfections.

15 Claims, 3 Drawing Sheets

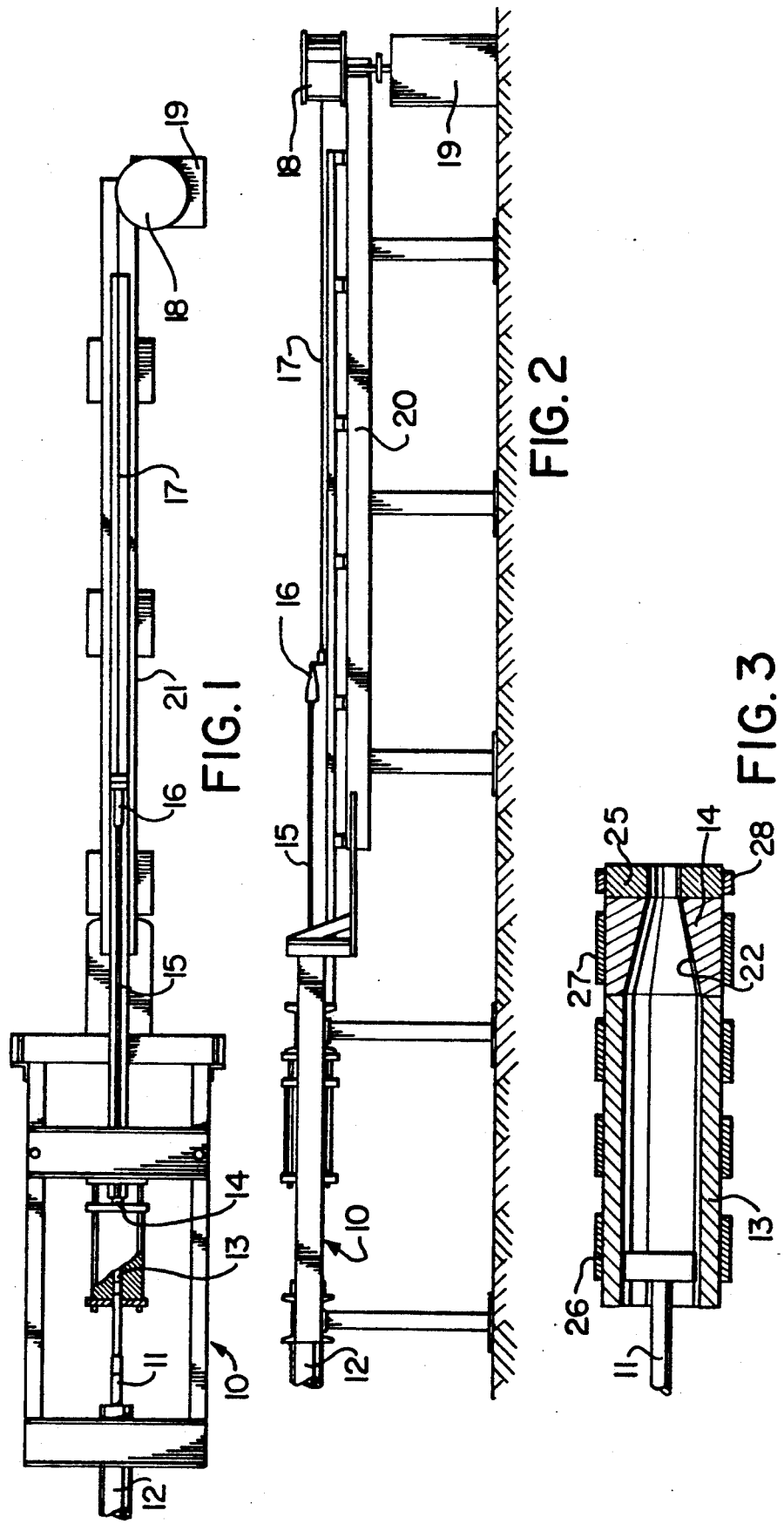

PROCESS FOR EXTRUDING POLYMER SHAPES WITH SMOOTH, UNBROKEN SURFACE

CROSS-REFERENCE TO RELATED APPLICATIONS

This application is a continuation-in-part of Ser. No. 07/539,076, filed Jun. 15, 1990, and Ser. No. 07/538,889, also filed Jun. 15, 1990, both now abandoned.

BACKGROUND OF THE INVENTION

1. Field of the Invention

This invention relates to an extrusion process for conversion of thermoplastic polymer billets into extruded shapes with smooth, unbroken surfaces.

This invention also relates to a solid-state deformation process, and more particularly to a process for solid-state extrusion of thermoplastic polymer billets into oriented large extruded shapes at high extrusion rates.

Most polymers have a chain of carbon to carbon bonds along their backbone. Upon solidification of some polymers, a portion of the polymer chains in the material are folded to form crystals which are randomly oriented within the material. If even a small portion of the material behaves in this manner, the material is referred to as semi-crystalline. Such material may deform easily by bending, sliding and breaking of the crystals or a small fraction of the non-crystalline entangled molecular chains. If the chains are aligned or oriented, the mechanical strength is much improved. It is well known that properties such as strength and stiffness are enhanced by aligning or oriented the polymer chains. One technique for orienting some polymers, such as polyethylene, is by plastic flow at temperatures below the melting point. The degree of orientation in such polymers is indicated by the increase in tensile modulus of the oriented polymer over the tensile modulus of the unoriented polymer.

Processes for the solid state deformation of polymers are well known. Among the processing techniques used to make profiles of polymers are ram and hydrostatic extrusion. In ram extrusion the billet of polymer is placed inside a usually cylindrical pressure chamber, so that the surface of the billet is in immediate contact with the walls of the chamber. One end of the chamber is fitted with a die, whose opening corresponds to the profile it is desired to produce. The other end of the pressure chamber is closed by an axially mobile ram, attached to a hydraulic system, so arranged that the ram pushes against the billet of the polymer and forces the polymer out from the chamber by flowing through the die.

In hydrostatic extrusion on the other hand, the billet is much smaller than the pressure chamber, and the surface is separated by some distance from the chamber wall. The intervening space is filled with a hydraulic fluid. One end of the chamber is fitted with a pressure generating device, which may be a piston, or by an inlet through which hydraulic fluid is pumped into the chamber. The other end of the chamber is fitted with the die. One end of the billet is machined in such a way that the nose piece fits into the throat of the die, and makes a liquid tight seal. During extrusion, the pressure on the hydraulic fluid is increased. This pressure is transmitted in both the axial direction and the radial direction to the billet, so that it is pressurized equally in all directions. As a consequence, the surface of the billet is in contact with the oil, and some of the oil adheres to the surface of the billet as it passes through the die, providing a significant amount of lubrication.

During solid state deformation processing such as rolling, drawing and extrusion, the polymers typically lose the spherulitic aspect generated during the cooling form the molten state, and become oriented usually in a longitudinal direction. The orientation of the polymer in a longitudinal direction increases the mechanical properties of the polymer, e.g. its tensile strength and stiffness. These are sought after properties. One disadvantage of oriented polymers is that they are weak in the transverse direction, and are subject to transverse cracking under stress, or to fibrillation under abrasion.

At the same time, the process of pushing the polymer through the chamber and the die creates surface imperfections which range from superficial defects, to micro cracks that extend a small distance into the profile, to much larger cracks and fissures. These are undesirable surface imperfections. They are caused by the frictional forces existing between the advancing polymer being pushed by the ram, and the surface of the metal of the pressure chamber, the die and the die land.

It is desirable to reduce these frictional forces, and at the same time prevent or remedy the defects that are produced during movement of the polymer through the extrusion apparatus. Furthermore, it is desirable to increase the toughness of the extruded polymer. Toughness is related to the degree of orientation of the polymer, the lower the degree or orientation, the higher the toughness in the transverse direction.

2. Description of the Related Art

Various prior workers have extruded semi-crystalline polymers by the ram extrusion method. For instance, Matsuo et al (U.S. Pat. No. 4,731,199) disclose that the use of lubricants of the acid ester type reduces the pressure required to extrude pipe profiles of sintered ultra high molecular weight polyethylene with a resulting improvement in the dimensional uniformity of the extrusion.

Ramamurthy (U.S. Pat. No. 4,554,120) discloses that use an alloy of Cu/Zn alloy in the land region of the die to replace the mild steel usually employed increases the adhesion of the polyethylene polymer to the die, and thereby improves the surface of thermoplastic extrusions. Ramamurthy (U.S. Pat. No. 4,552,712) discloses that use of stainless steel in the land region of the die to replace the mild steel usually employed, and the use of an additive to the polymers increases the adhesion of the polyethylene polymer to the die, and thereby improves the surface of thermoplastic extrusions.

Hureau et al (U.S. Pat. No. 4,303,609) disclose that an extrudate of a thermoplastic polymer can be modified by heating it after exit from the die, by blowing hot air from nozzles onto its surface such that the polymer melts.

Nippon Steel Chem KK (Japanese Patent Application 63 161075) discloses that the surface of the extrudates of polyethylene can be improved by adding a lubricant to the polyethylene polymer before extrusion.

Japanese Patent Application 52 148,562 discloses heating the surface of an extruded polyethylene with a gas burner, in order to make the surface accept a conducting material.

Chung et al "Energy Efficiency in Plasticating Screw Extrusion", American Chemical Society, Preprints v. 39, for National Meeting of American Chemical Society, 176th, Miami Beach, Sep. 10–15, 1978, Published by the American Chemical Society, Division of Organic Coatings and Plastic Chemicals, Washington, D.C., 1978, p 74 to 80, discloses that when a solid plug of polymer is rubbed on a heated barrel surface, a thin layer of melt or melt film develops between the solid plug and the barrel surface. The Chung paper does not propose the use of this heating and melting to improve the properties of the extrudate, rather their interest is to use the molten polymer as a lubricant, and thereby reduce the energy required to process and melt the polymer.

SUMMARY OF THE INVENTION

It is an object of the present invention to extrude, or otherwise solid-state deform, polymers through a die, or by other means of deformation, while avoiding undesirable surface imperfections.

It is also an object of the present invention to modify the solid state extrusion process and other solid state deformation processes such that they can be used to produce oriented polymer profiles with tensile strength and modulus greater than that of the starting material (preferably about 5–30 times greater than that of the starting material), while producing profiles of cross-sectional areas greater than 0.5 cm$^2$ at high extrusion rates above 50 cm/min.

In accordance with one aspect of the invention, in a solid state deforming process a thermoplastic polymer, preferably a semi-crystalline polymer shape, is deformed, preferably by being forced through a die, to form a highly oriented polymer shape. The process includes the steps of providing a deformation area, such as a die, for producing a polymer profile with a cross-sectional area greater than 0.5 cm$^2$, heating the polymer shape to a temperature below the melting point of the polymer, and heating the deformation area, such as a die, to a temperature at least about as high as the temperature of the polymer shape. The polymer shape is deformed, as by extrusion through a pressure chamber and a deformation area, such as a die, at a rate greater than 50 cm/min. and a deformation ratio of greater than 5. A haul-off stress may be applied to the oriented polymer profile between at least 0.5 MPa and a maximum amount without plastically deforming the profile as it leaves the deformation area.

Also in accordance with this invention, the temperature of the polymer on the outer surface of the polymer in the deformation area, such as a die, is controlled so that a thin surface layer of the polymer profile being deformed, as by extrusion, is melted, at least partially, to form a thin, smooth surface layer on the profile of reduced orientation and increased toughness.

In accordance with another aspect of the invention, an oriented polymer shape extending in a longitudinal direction is produced having an outer surface layer of reduced orientation. Because tensile modulus is an indication of the degree of orientation, these shapes also have an outer layer of reduced tensile modulus. This outer surface layer has a lower tensile modulus than the tensile modulus of layers located closer to the longitudinal axis of the oriented polymer shape. In some embodiments, the tensile modulus of the shape increases from a first point near the center of a cross-section of the shape to a second point on the radius extending outward from the longitudinal axis of the shape, and the tensile modulus then decreases from the second point to a third point on the outer surface of the shape.

Other advantages of the present invention will be apparent from the following detailed description of the invention by reference to the drawings wherein like reference numbers refer to like elements in the several figures.

BRIEF DESCRIPTION OF THE DRAWINGS

FIG. 1 is a plan view of the extrusion apparatus according to the invention;

FIG. 2 is a side view of the device of FIG. 1;

FIG. 3 is a sectional view of an extrusion chamber and die according to the invention;

DESCRIPTION OF THE PREFERRED EMBODIMENTS

Figure 4:
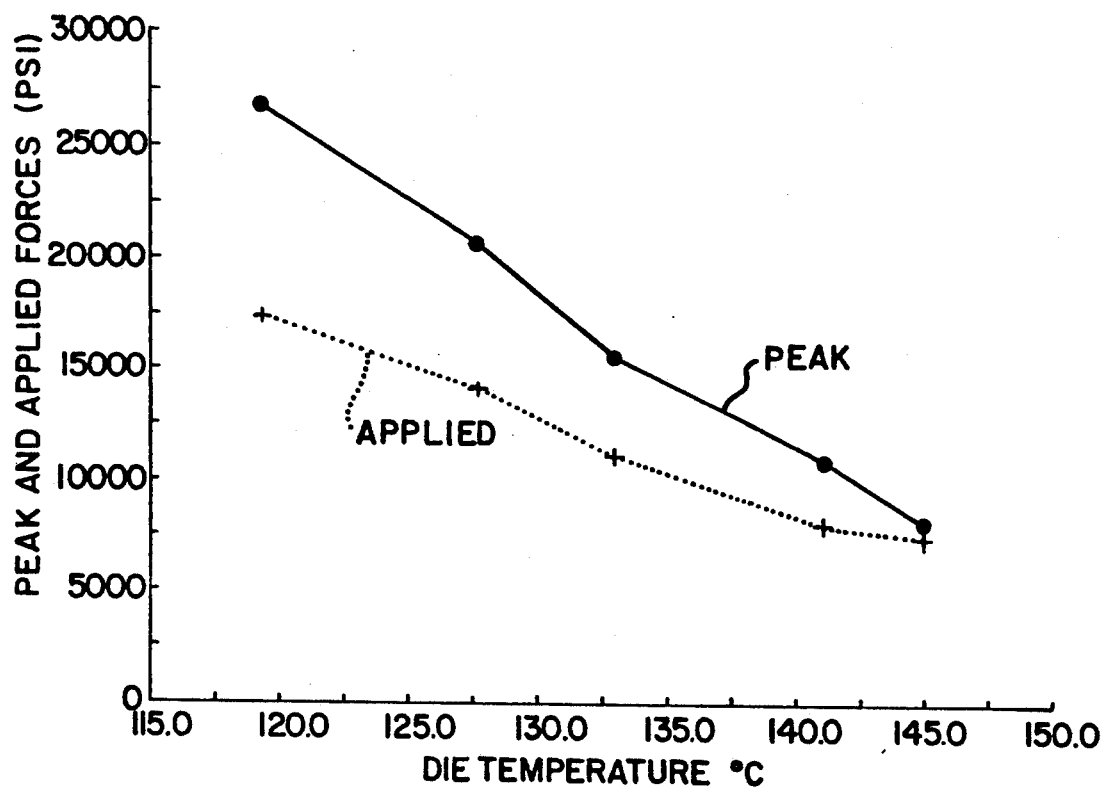
FIG. 4 is a plot of ram forces as a function of die temperature.

According to the present invention, it has been discovered that it is possible to substantially reduce or eliminate undesirable surface imperfections in deformed or extruded polymers by specially heating and in some cases melting a thin surface layer of the polymer being extruded. This thin heated or melted layer, preferably having a thickness of about 0.01–1.0 mm, acts as a lubricant within the deformation area, e.g. extrusion die, to create a very smooth surface and give a more ductile and tougher surface to the oriented polymer, e.g. extrudate. The melting of the surface of the extrudate reduces markedly the degree of orientation and increases the toughness within the thin surface layer. Thus, the less oriented polymer of the surface layer provides desired toughness, while the more oriented polymer inside the shape provides mechanical strength.

When a polymer billet is extruded through a die to form, for example, a round rod profile, the degree of orientation of the molecular chains in a cross-section of the billet generally increases the further the molecular chains are located radially from the axial center of the profile. In other words, the tensile modulus of the profile measured across a cross-section is generally higher near the outer edges of the profile than it is near the axial center of the profile, and the tensile modulus decreases close to the axial center because less and less orientation has taken place. To increase the toughness of the profile, a thin layer on the outer surface is specially heated or melted. This disorients the molecular chains in the specially heated or melted outer layer and reduces the tensile modulus near the outer surface. Accordingly, a polymer profile extruded in accordance with the invention will have a maximum tensile modulus at a interior portion located adjacent to the heated or melted thin outer layer.

In the use of the present invention, the production rates in the solid state deformation, e.g., ram extrusion, of thermoplastic polymers shapes, e.g., semi-crystalline polymer billets, can be significantly increased, even when making profiles of cross-sectional areas greater than 0.5 cm$^2$, by special control of the temperatures of the polymer and the die, in combination with special control of haul off stress on the extrudate. The pressure or extrusion chamber containing the polymer and the die are separately heated, with the die preferably but not necessarily being maintained at a temperature above that of the polymer. These temperatures are such that the polymer is softened but essentially still solid during the extrusion process.

Thus, the invention in its broadest aspect relates to a solid state deformation process in which a thermoplastic polymer shape, preferably of a semi-crystalline material, is deformed to create an oriented polymer shape, preferably a highly oriented polymer shape. Most preferably, a semi-crystalline polymer shape is placed in a pressure chamber and is forced by a ram from the pressure chamber through a die at the end of the chamber. The polymer passes through the die at a temperature ranging between as much as 30° C. below the alpha-crystalline temperature and the melting point of the polymer, forming an oriented polymer profile. According to the invention, the billet in the pressure chamber is maintained at a temperature about 0.50–0.95 times the melting point of the polymer in degrees Celsius. That is, for a polymer having a melting point of 130° C., the pressure chamber is maintained at about 65° to 124° C. The die is heated to above 0.50 times the melting point of the polymer or preferably above 0.65 times the melting point of the polymer. Most preferably the die is about 0.65–1.2 times the melting point of the polymer, with the die being at least 5° C. warmer than the polymer. The haul off stress on the extrudate or deformed polymer may maintained between at least 0.5 MPa and the maximum amount possible without plastic deformation. These and other temperatures used herein refer to the temperature of the pressure chamber and the temperature of the die themselves. These temperatures do not take into account the internal increases in temperature that may be caused within the polymer shape as a result of deformation forces upon it.

Deformation ratio, as used herein, means the ratio of the cross-sectional area of the polymer shape before deformation to the cross sectional area of the polymer after deformation and orientation. In the processes of this invention deformation ratios of 5 to 30 are preferable, with those in the range above 8 being more preferred, and those in the range above 10 being most preferred. These ratios of 8 to 10 and above are high deformation ratios in polymers such as polyethylene, which means that the polymer has become highly oriented as a result of deformation.

As used herein, "highly oriented" refers to the morphology of a polymer shape. As explained above, polymer shapes after cooling from the molten state have spherulitic morphology. After substantial deformation in the solid state, these shapes have a fibrillar morphology. Fibrillar morphology differs from "fibrillation", which refers to a kind of material failure. Fibrillar morphology in the case of polyethylene the molecular weights used in the examples of this application begins to appear at a draw ratio of about 5, at which point the polymer begins to become oriented. Fibrillar morphology is obtained in polyethylene of the molecular weights of the examples herein at draw ratios of 8 to 10 and above. Polymer shapes with such a non-spherulitic, or a fibrillar, morphology are called "highly oriented".

This high degree of orientation causes the polymer to become stronger and stiffer relative to its randomly oriented state, as is present after solidification from the melted state. The stronger and stiffer nature of the highly oriented polymer makes it difficult to extrude at high rates. The extrusion ratio required to achieve a highly oriented polymer will vary with the particular polymer involved and its molecular weight. The present invention is preferably used to obtain highly oriented polymers of large cross section at high extrusion rates. For polyethylene, polypropylene and many other polymers of this invention an oriented polymer is obtained beginning at a deformation ratio of greater than 5, or preferably greater than 8, and most preferably greater than 10.

The temperature of the pressure chamber holding the polymer and the temperature of the die are about the same in one embodiment of the invention. A preferred embodiment of the invention, however, maintains the die temperature at least 5° C. warmer than the billet temperature. Both embodiments produce an oriented profile with the disclosed cross-sectional area at an extrusion rate greater than 0.5 m/min.

The invention is particularly advantageous for the production of profiles with cross-sectional areas greater than 1 cm$^2$ at production rates greater than 1 m/min.

According to one feature of the invention, a thin surface layer of the polymer being extruded is melted to form a melt layer having a thickness of about 0.01–1.0 mm. This acts as a lubricant within the extrusion die and coats the extrudate with a smooth and tough surface.

The melting of the surface of the polymer being extruded can be achieved in a number of different ways. For instance, it may be achieved by applying a high mechanical shear rate to the heated but still solid polymer billet as the polymer is forced past the stationary metal surface of the die. Friction within the die may create sufficient additional heat to melt the surface of the polymer.

When the extrusion is carried out by, for example, ram extrusion, involving placing the heated billet in the pressure chamber, it is also possible to apply electrical heating to the outside walls of the pressure chamber and die. This may be combined with cooling modules, installed on the outside of the chamber and die.

Finally, it is possible to circulate a heat exchange fluid through the interior of the pressure chamber walls and the die walls. The heat exchange fluid can provide either heating or cooling, depending upon the extrusion conditions.

For carrying out the present invention, the billet in the pressure chamber is preferably heated to about 0.6–0.9 times, or preferably 0.7 to 0.9 times, the melting point of the polymer and the die is preferably heated to about 0.9–1.2 times the melting point of the polymer. The polymer is extruded at a rate of 0.1–10 m/min. and the temperature used depends upon the extrusion rate such as to keep the heated or melted layer within 0.01–1.0 mm thickness. Excessive melting degrades the mechanical properties and dimensional tolerances of the profile.

The process of the invention in generally applicable to thermoplastic polymers that can be oriented during solid state deformation. The process is particularly useful for producing solid state extrusions of semi-crystalline polymers at high speeds, including polymers capable of molecular orientation during processing. Substantially linear polymers are preferred, that is polymers in which chain branching occurs in less than in 1 per 1000 polymer units. Polyethylene and polypropylene are particularly suitable for extrusion by the inventive process, but other polymers including fluorinated and oxygen substituted hydrocarbon polymers, can also be extruded in a very satisfactory way. Examples of such polymers including polypropylene, polyethylene, polymethylpentane, polytetrafluorethylene, e.g. TEFLON ®, polyamides such as NYLON ®, polyesters such as polyethylene terephthalate (DACRON ®, TERYLENE ®), polyethylene oxide, polyoxymethylene, liquid crystal polymers such as VECTRA ®, etc.

It is also desirable to provide a haul off stress on the extrudate, and this is preferably maintained between at least 0.5 MPa and the maximum amount possible without plastic deformation.

The haul off stress can be applied by known means, e.g. a cable and power driven reel. The stress is used to obtain smooth, stable polymer flow from the die, to provide straight profiles and to prevent slip-stick motion. Preferably the stress is the maximum permissible without plastic drawing or deformation of the profile. Typically, this stress is in the range of 1 to 20 MPa.

As mentioned above, this invention may be used at high extrusion rates. The prior art had found the rate of solid state extrusion of thermoplastic polymers, such as semi-crystalline polymers, to be very slow (Bigg article at p. 834). Previous attempts to extrude at high rates resulted in process instabilities. High pressures at high draw ratios (12 to 17 for high density polyethylene) had reached a point of diminishing returns.

Without being bound to any theory of operation, the present invention may be explainable in terms of two forces which must be overcome to produce an oriented profile by extrusion. The first force is the force due to friction, which is the force necessary to overcome the friction of the polymer against the die and is approximately proportional to the external surface area of the polymer profile. The pressure due to friction (force per unit area) is therefore inversely proportional to the diameter in the die. The second force is the force due to orientation, which is the force necessary to orient the molecular chains in the polymer and is approximately proportional to the cross-sectional area of the polymer in the die. The pressure due to orientation is therefore approximately independent of the diameter of the die. If these relationships are correct, it may be that extrusion or deformation rates based on small diameter extrusions should not be extrapolated, as many in the art apparently have done, to large diameter extrusions. At small diameters, the pressure due to friction is high and prevents high extrusion rates, but at large diameters, it may be that the pressure due to friction becomes less of a factor, while pressure due to orientation changes little if at all, thus permitting higher extrusion rates than expected. Another explanation may be that in prior art small diameter solid state extrusion processes, heat created by the work and deformation of extrusion was dissipated at a different rate and with a different effect than in large diameter extrusion processes.

The die preferably includes a tapered section about 15-30 cm long, usually tapered at between 10° and 40°, and a land portion at the outlet end about 2 to 4 cm long in which no plastic deformation of the polymer takes place. The die land may be heated separately from the die and may, if desired, be held at a different temperature than the die. However, the die and land are normally held at approximately the same temperature. It is preferable that the land portion have a polished smooth finish, and polishing the entire inner surface of the die is also preferable. It is further preferred that the die is made from a material having high thermal conductivity, such as mild steel.

According to a preferred feature, the heating of the pressure chamber and the die can conveniently be done by means of electric band heaters surrounding the pressure chamber and die. Thermocouples sense the temperature of the inside wall of the pressure chamber and the inside wall of the die and adjust controllers for the band heaters separately. If desired, a separate band heater and thermocouple may be provided for the die land.

According to another embodiment, the heating may be done by circulating a heat exchange fluid through the interior of the chamber walls and the die walls.

With the process of this invention, it is possible to produce profiles having cross-sectional areas to up to 100 $cm^2$ at production rates up to 10 m/min. These profiles can vary widely in configuration, e.g. cylindrical, I-beam, C-channel, L-shaped, rectangular, square, hollow cylinder, etc.

The device shown in FIGS. 1 and 2 is a typical 30 tonne capacity extrusion press, consisting of a ram extruder section 10 and a haul off bench 20. The ram extruder comprises a pressure chamber 13 into which extends a ram 11 driven by an hydraulic cylinder 12. The pressure chamber 13 connects to a die 14, the outlet of which connects to a runout table 21.

The extrudate 15 is connected to a gripper 16 whereby haul-off stress is applied by means of cable 17 connected to spool 18 and motor 19.

In the particular device used in the examples, the working area of the ram 11 is 9.6 $cm^2$ and a maximum pressure of 285 MPa can be applied to the ram.

The actual die itself can be better seen from FIG. 3. Thus, it will be noted that the die 14 has a tapered portion 22 and a land section 25. The tapered portion is at an angle of 15°, to produce a uniform streamlined flow. The pressure chamber 13 is surrounded by band heaters 26 and the die portion 14 is surrounded by separate band heaters 27. The land portion 25 is heated by band heater 28.

The above device was used to carry out a series of different experiments. In all tests, the starting material was a cylindrical billet of DuPont 2909 polyethylene typically having a diameter of about 3.5 cm and a length of about 20 cm.

EXAMPLE 1

Rectangular profiles having a dimension of 3.5 cm × 0.2 cm were produced from DuPont 2909 polyethylene using device of FIGS. 1-3. The billet temperature was 120° C., the die temperature was 140° C. and the die angle was 15°. The extrusion speed of the profile was 1.8 m/minute and an extrudate was obtained having a smooth, unbroken tough surface. Metallographic examination showed that the surface of the extrudate had been melted to a depth of less than 0.5 mm.

EXAMPLE 2

The device of FIGS. 1-3 was used to produce rectangular files having dimensions of 3.5 cm × 0.2 cm using a 15° taper die.

The temperature of the die was varied between 115°-145° C. and the temperature of the die land was also varied between 115°-145°C.

The extrusion was carried out at an extrusion speed of 2.2 m/min. and the results are shown in Table 1 below.

TABLE I

| SAMPLE NO | DIE TEMP. °C. | DIE TEMP. °C. | UTS STRESS MPa | MODULUS GPa | QUAL. (1-5*) | SURFACE MELTING |
| --- | --- | --- | --- | --- | --- | --- |
| 1 | 144.9 | 141.5 | 232.6 | 8.64 | 4 | YES |
| 2 | 141.1 | 115.6 | 236.5 | 6.99 | 4 | YES |
| 3 | 127.7 | 138.3 | 239.6 | 7.01 | 1 | NO |
| 4 | 119.4 | 114.8 | 166.9 | 8.76 | 1 | NO |
| 5 | 133.0 | 132.6 | 171.0 | 8.07 | 2 | NO |

QUALITY
*1 - Very Bad (Irregular, dull surface)
2 - Bad
3 - Average
4 - Good
5 - Very Good (Smooth, flat reflective surface)

Peak and applied forces on the ram were determined for different die temperatures and these were plotted in FIG. 4. The results show that the forces which are mainly due to friction in the die increases with decreases die temperature.

Figure 5:
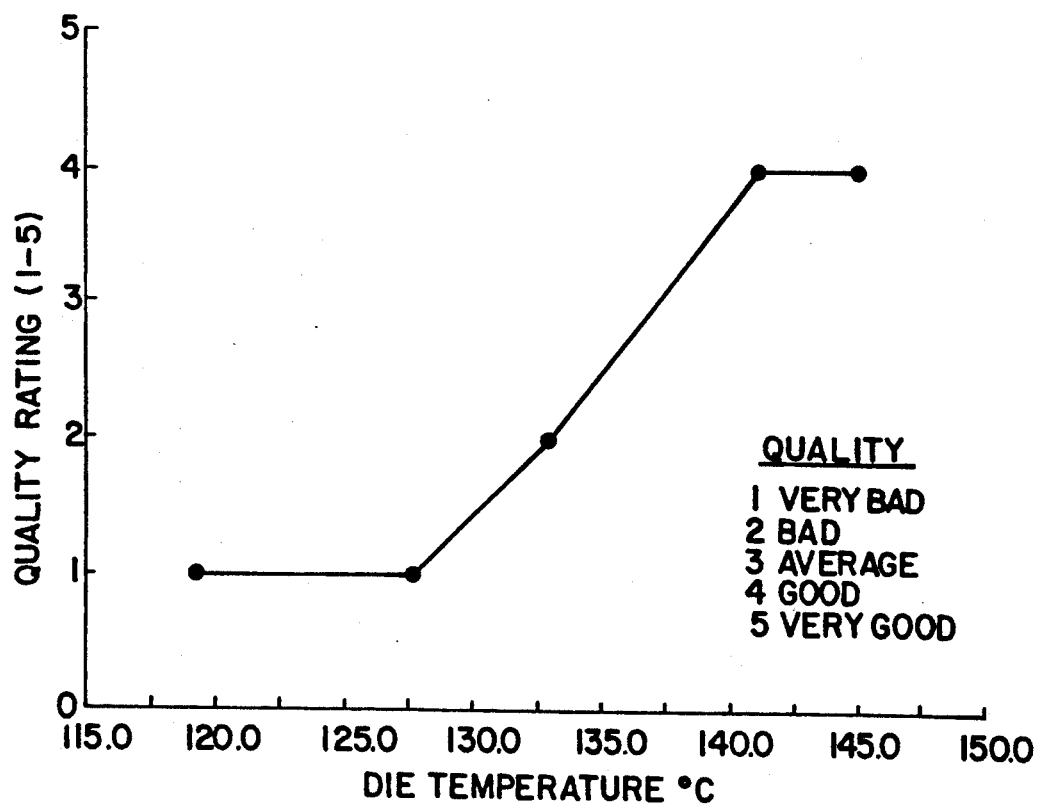
FIG. 5 and 6 are plots of surface quality as a function of die temperature.

The quality of the extrudate surface was also plotted as a function of die temperature in FIG. 5 and this shows a very significant improvement in the extrudate quality with a higher die temperature. The abrasion resistance of the melted surface of the extrudates was higher than that of extrudates whose surfaces had not been melted.

In general, this test teaches that a hotter die gives a better looking extrudate while not adversely effecting the bulk properties.

EXAMPLE 3

The procedure of Example 1 was repeated, but the die and land temperature were varied from 110° to 150° C.

Figure 6:
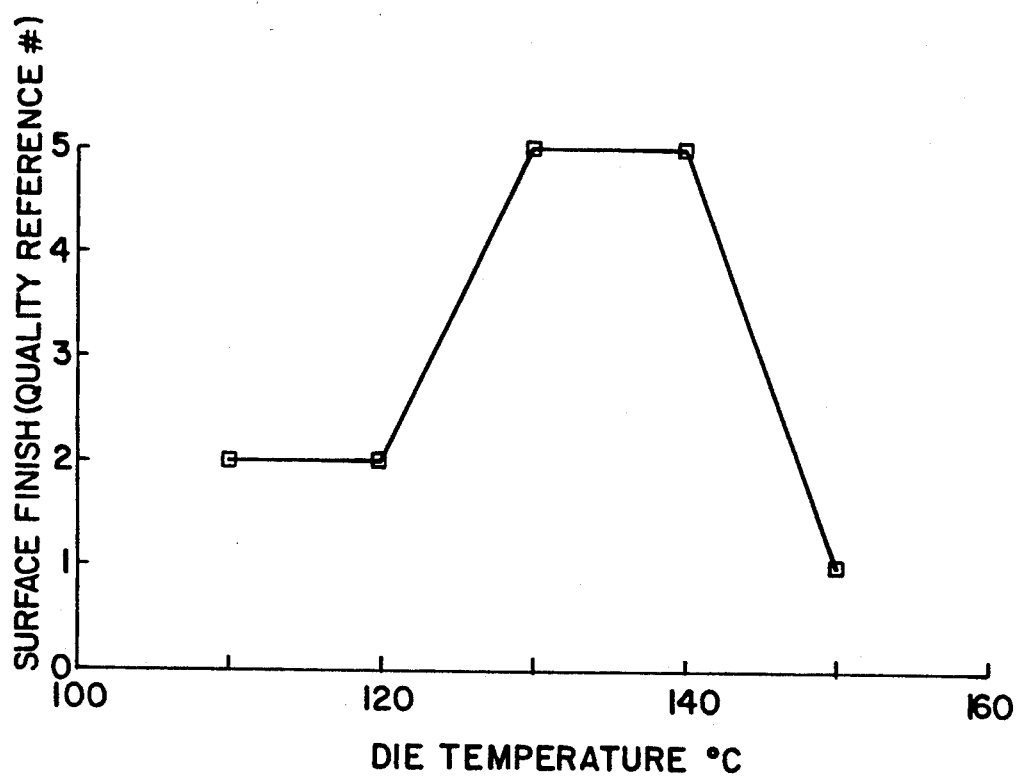

The quality of the extrudate surface was plotted as a function of die temperature in FIG. 6. This shows that when the die temperature becomes too high, the quality of the surface deteriorates, due to excessive melting. In this example, the quality began to deteriorate at die temperature greater than 140° C.

EXAMPLE 4

A round rod profile was produced from a cylindrical billet of DuPont 2909 polyethylene (average molecular weight of 55,000) having a diameter of 10 cm and a length of 35 cm using the apparatus illustrated in FIGS. 1-3 but a 100 tonne capacity extrusion press was used. The apparatus was equipped with a die such that the final diameter of the rod was 2.5 cm, corresponding to a draw ratio of 16.0. The billet temperature was 115° C. and the die temperature was 132° C.

The extruded output rate was 1.5 m/minute. In most cases a lubricant consisting of a silicone fluid was applied to the billet prior to extrusion. A haul off tension was applied by the extrudate by a loading of 125 kg. This applied stress did not result in any change in cross sectional diameter of the extrudate, which had the same diameter as the die land. Hence there was no drawing of the profile after exiting the die. The haul off stress had a four-fold purpose: (1) to keep the profile running straight as it exited the die land; (2) to prevent slip-stick motion; (3) to maintain extrudate properties, i.e., up to 40% of tensile modulus and strength can be lost due to elastic recovery if no stress is applied to the extrudate; and (4) to maintain the dimension within narrow tolerances.

Extrudates prepared in these experiments had a smooth even surface, with no evidence of slip-stick surface irregularities, a modulus of 9.4 GPa, depending upon exact processing conditions and draw ratio. The material had a modulus of 0.6–0.7 GPa. Thus increases in modulus up to 15 fold were achieved. The diameter of the rod was within ±2% of the diameter of the die land.

EXAMPLE 5

An I-beam profile was produced, using the same polymer billet material and apparatus as in Example 4, at a draw ratio of 27. This produced an I-beam of 5.0 cm in width, 2.5 cm in depth with a flange and web thickness of 3.0 mm. The billet temperature was 120° C. and the die temperature 150° C. A haul off loading of about 40 kg was applied to the extrudate. The extrudate output rate was 0.5 m/minute. The flange of the I-beam had a modulus of 19–20 GPa and the web 13–17 GPa.

EXAMPLE 6

(Comparative)

A rectangular profile 3.6×0.3 cm, using the same polymer billet material and apparatus as in Example 4, was produced at a rate of 1.3 m/minute. The billet temperature was 80° C. with a die temperature set at 120° C. No haul. off stress was applied for this experiment. The modulus was 23.8 GPa and the strength was 215 MPa. Due to a lack of haul off stress, the product was curved, had an uneven surface and an unacceptable variation in diameter.

EXAMPLE 7

A channel section, 8.4 cm wide, 3 cm deep and 5 mm thick, was produced, using the same polymer billet material and apparatus as in Example 4, at a draw ratio of 13. The billet temperature was 110° C. and the die temperature was 140° C. A haul-off load of 120 kg was applied to the extrudate. The output rate was 1.2 m/minute. The flange of the channel had a modulus of 17.9 GPa and the web had a modulus of 11.2 GPa.

EXAMPLE 8

Again using the same billet material and apparatus as in Example 4, an identical extrusion was carried out with and without a silicone lubricant. The operation conditions and results are shown in the following table:

| | |
| --- | --- |
| Profile | 2.8 cm diameter rod |
| Draw Ratio | 13 |
| Billet Temperature | 90° C. |
| Die Temperature | 132° C. |
| Modulus of Profile Without Using | 9.9 GPa |

| | |
|---|---|
| Lubricant Modules of Profile Using Lubricant | 9.7 GPa |
| Peak Force in Ram Without Lubricant | 105,493 KPA |
| Peak Force in Ram With Lubricant | 82,395 KPA |

The above test shows that by using the lubricant, the force required to produce an oriented polyethylene extrudate can be reduced by 22% without any significant loss of stiffness. The use of the lubricant improved the appearance of the surface and reduced the roughness.

EXAMPLE 9

Using the same apparatus as in the above Examples 4 to 8, a billet of Shell 6100 polypropylene having a diameter of 10 cm and a length of 35 cm was used to produce an L-shaped profile 5.0×5.0×0.6 cm at a draw ratio of 13.3. The die temperature was 220° C. and the billet temperature was 160° C. and the extrusion rate was 1.2 m/min. A straight, smooth profile was produced having a modulus ten times greater than that of the starting material.

EXAMPLE 10

A flat bar shape profile was produced using a die with a draw ratio of 7.89. A high molecular weight polyethylene Dupont 16A (average molecular weight 200,000) was used as the billet material. The billet temperature was 100° C. and the die temperature was 110° C. The profile had a modulus of 4.66 GPa when a haul-off tension was applied. A run without applying the haul-off tension was conducted and resulted in the profile having a modulus of 2.93 GPa.

EXAMPLE 11

An angular profile was produced from a cylindrical billet of Dupont 2909 polyethylene. The draw ratio of the die is approximately 14. The billet and the die were both heated to a temperature of 100° C. and a haul-off tension of 200 lbs was applied to the extrudate. The tensile modulus of the extruded profile was 16.83 GPa.

Although specific embodiments of the present invention have been described above in detail, it will be understood that this description is merely for purposes of understanding the present invention. Modifications of the preferred embodiments described herein may be made by those skilled in the art without departing from the scope of the present invention which is set forth in the following claims.

We claim:

1. A solid state extrusion process in which a semi-crystalline polymer billet in a pressure chamber is forced through a die to form an oriented polymer profile, comprising the steps of:
    preheating the pressure chamber to a temperature below the melting point of the polymer billet;
    preheating the die to a temperature at least as high as the temperature of the pressure chamber;
    extruding the polymer billet through the pressure chamber and die to form an oriented polymer profile oriented in the longitudinal direction; and
    controlling the temperature of the die so that a thin surface layer of the oriented polymer profile being extruded is melted to form a thin, smooth surface layer on the oriented polymer profile of reduced orientation in the longitudinal direction and increase toughness.

2. A solid state extrusion process as set forth in claim 1, further comprising the step of heating the pressure chamber to a temperature between 0.6-0.9 times the melting point of the polymer billet.

3. A solid state extrusion process as set forth in claim 2, further comprising the step of heating the die to a temperature between 0.9-1.2 times the melting point of the polymer billet.

4. A solid state extrusion process as set forth in claim 1, wherein the melted layer has a thickness of 0.01-1.0 mm.

5. A solid state extrusion process as set forth in claim 1, wherein the polymer billet is polyethylene or polypropylene.

6. A solid state extrusion process as set forth in claim 1, wherein the extrusion speed is 0.1-10 m/min.

7. A solid state extrusion process as set forth in claim 1, wherein the die includes a land portion and further comprising the step of heating the land portion separately from the die.

8. A solid state extrusion process as set forth in claim 1, further comprising the step of applying a haul-off stress to the oriented polymer profile between at least 0.5 MPa and a maximum amount without plastically deforming the profile as it is being extruded.

9. A solid state extrusion process in which a semi-crystalline polymer billet in a pressure chamber is forced through a die to form an oriented polymer profile, comprising the steps of:
    providing a deforming area in the die for producing an oriented polymer profile with a cross-sectional area greater than 0.5 cm$^2$;
    preheating the pressure chamber to a temperature below the melting point of the polymer billet;
    preheating the die to a temperature at least as high as the temperature of the pressure chamber;
    extruding the polymer billet through the pressure chamber and die at a rate greater than 50 cm/min to form an oriented polymer profile oriented in the longitudinal direction; and
    controlling the temperature of the die so that a thin surface layer of the oriented polymer profile being extruded is melted to form a thin, smooth surface layer on the oriented polymer profile of reduced orientation in the longitudinal direction and increase toughness.

10. A solid state extrusion process as set forth in claim 9, further comprising the step of heating the pressure chamber to a temperature between 0.6-0.9 times the melting point of the polymer billet.

11. A solid state extrusion process as set forth in claim 10, further comprising the step of heating the die to a temperature between 0.9-1.2 times the melting point of the polymer billet.

12. A solid state extrusion process as set forth in claim 9, wherein the melted layer has a thickness of 0.01-1.0 mm.

13. A solid state extrusion process as set forth in claim 9, wherein the polymer billet is polyethylene or polypropylene.

14. A solid state extrusion process as set forth in claim 9, wherein the die includes a land portion and further comprising the step of heating the land portion separately from the die.

15. A solid state extrusion process as set forth in claim 9, further comprising the step of applying a haul-off stress to the oriented polymer profile between at least 0.5 MPa and a maximum amount without plastically deforming the profile as it is being extruded.

* * * * *